June 5, 1928.
E. H. FREIBURGHOUSE
DYNAMO ELECTRIC MACHINE
Filed April 21, 1925
1,672,680
2 Sheets-Sheet 1
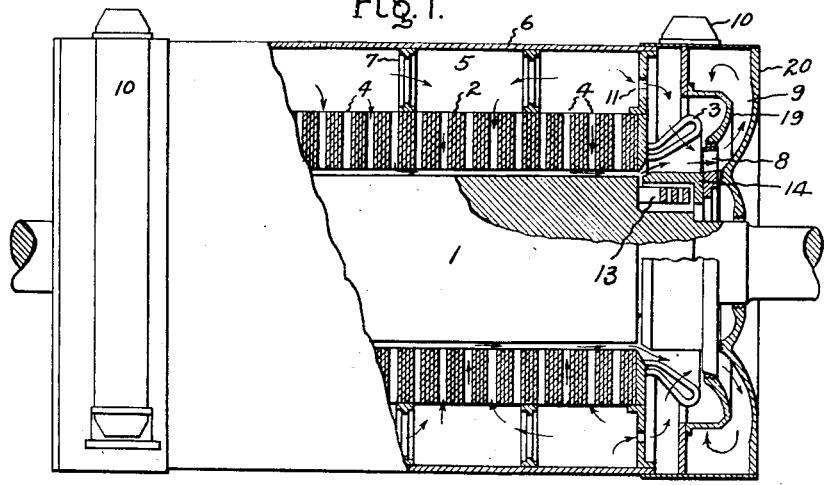
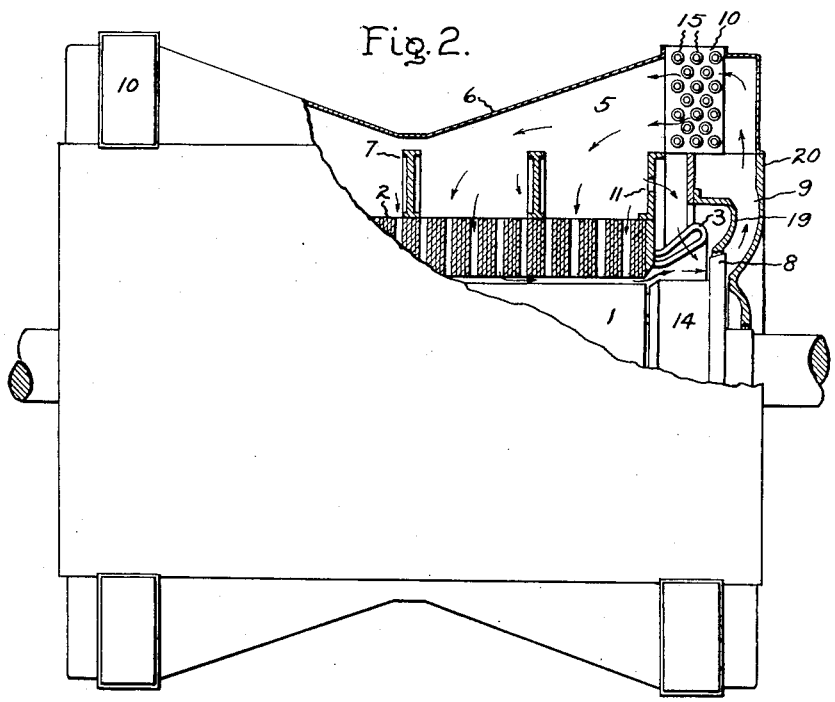
Inventor
Edward H. Freiburghouse
by
His Attorney June 5, 1928.
E. H. FREIBURGHOUSE
1,672,680
DYNAMO ELECTRIC MACHINE
Filed April 21, 1925    2 Sheets-Sheet 2
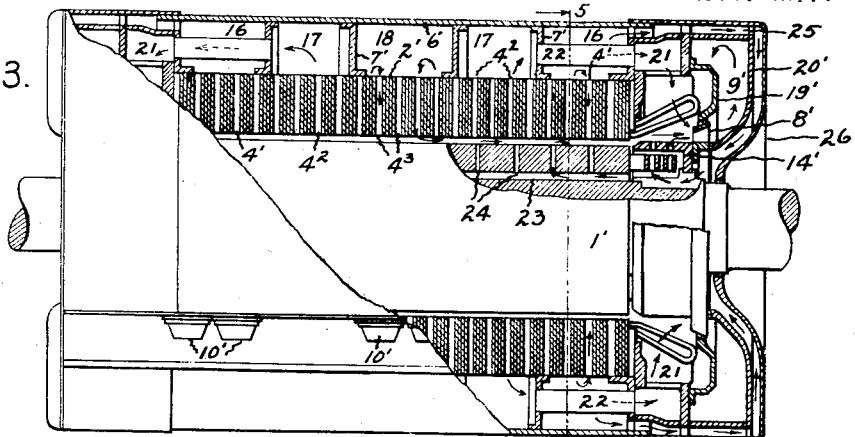
Fig. 3.
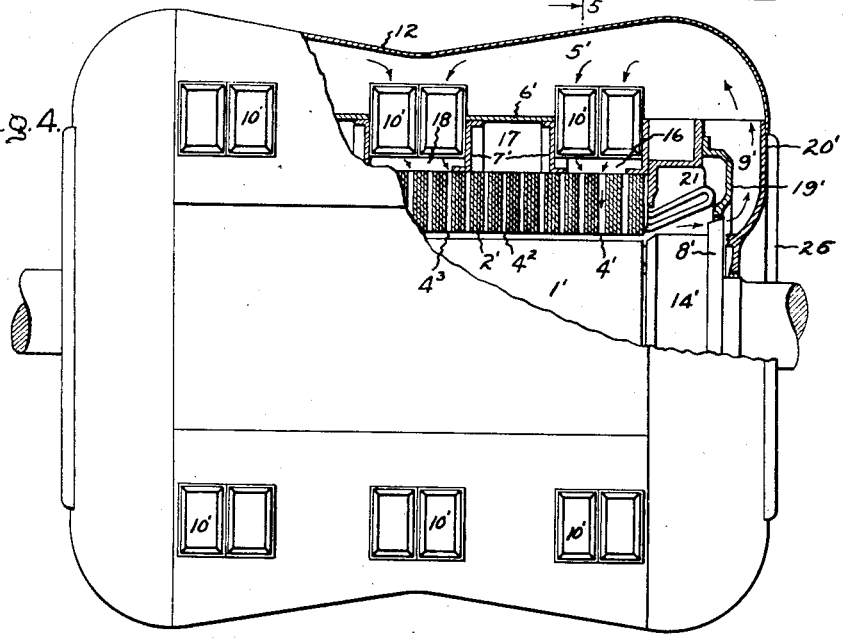
Fig. 4.
Fig. 5.
Inventor
Edward H. Freiburghouse
by
His Attorney Patented June 5, 1928.

1,672,680

UNITED STATES PATENT OFFICE.

EDWARD H. FREIBURGHOUSE, OF SCHENECTADY, NEW YORK, ASSIGNOR TO GENERAL ELECTRIC COMPANY, A CORPORATION OF NEW YORK.

DYNAMO-ELECTRIC MACHINE.

Application filed April 21, 1925. Serial No. 24,867.

My invention relates to dynamo electric machines and particularly to the ventilation of such machines.

Heretofore, in ventilating such machines, a fan has been used which forces the cooling fluid at a high velocity into or past the end windings of the machine and also into the air gap. This method of ventilation is inefficient because the velocity head of the cooling fluid leaving the fan tips is practically all lost and only the static pressure of the cooling fluid is availed of, to force the air through the air gap and the ventilating passages. The high velocity jets of cooling fluid also cause noise as they blow past the end windings. Furthermore, the cooling fluid in passing through the fan is heated up by the fan losses and this heat is conveyed to the machine.

My invention has for one of its objects to provide an improved ventilating system, which is more efficient than those heretofore in use and in which the heat produced by the fan is not conveyed to the machine. To this end, my invention consists in forcing cooling fluid through a dynamo electric machine in a direction, the reverse of that heretofore employed.

Other objects of my invention and other features of novelty will be pointed out hereinafter.

For a better understanding of my invention, reference may be had to the following description taken in connection with the accompanying drawing, in which Fig. 1 is an elevation, partly in section, of a dynamo electric machine embodying my invention; Fig. 2 is a plan view, partly in section, of the machine of Fig. 1; Fig. 3 is an elevation, partly in section, of a dynamo electric machine embodying a modification of my invention; Fig. 4 is a plan view, partly in section, of the machine of Fig. 3, and Fig. 5 is a section on the line 5—5 of Fig. 3.

Like letters of reference are used throughout the several figures of the drawing to denote like parts.

Referring to Figs. 1 and 2 of the drawing, I have illustrated my invention applied to a dynamo electric machine, which is comparatively short in length. In these figures, 1 is a rotatable member surrounded by a laminated stationary member 2 provided with windings having end connections or portions 3. This stationary member is provided with radial ventilating spaces 4. A chamber 5 is formed about the outer periphery of the ventilating spaces by means of a casing member 6 which is supported by web members 7. The ventilating spaces 4 communicate with the chamber 5 and the air gap between the stationary and rotatable members.

Mounted on each end of the rotatable member are fans 8. The intakes of the fans communicate with the air gap and the outlets of the fans with the chamber 5 through discharge rings 9. These discharge rings 9, having an increasing cross section, are formed by end shields 19 and 20, and are mounted adjacent the fans. Between the discharge rings 9 and the chamber 5 are mounted surface coolers 10.

The circulation of the cooling fluid is indicated in the drawing by arrows. The fans 8 draw cooling fluid, such as air, out of the air gap between the rotatable and stationary members and force it into the discharge rings 9, where its velocity head is gradually converted into a static pressure. The cooling fluid then passes into chamber 5, thence through the radial ventilating spaces 4 into the air gap and back to the intake of the fans a small quantity of cooling fluid will pass through openings 11 in the end web members 7 and will be drawn by the fans 8 over the end connections 3 of the winding on the stationary member, thereby cooling the same.

The rotatable member 1 comprises the usual core structure with windings thereon, these windings having end connections 13 surrounded by retaining rings 14. The fan members 8 are preferably mounted on the retaining rings 14, the opening of the fan to the air gap being located beyond the outer periphery of the retaining ring, as clearly seen in Fig. 1 of the drawing. This fan is shown as of the axial type, and with the direction of air flow herein described, the opening of the fan toward the air gap is the intake of the fan.

The surface coolers 10 are of the usual type and comprise tubes 15 provided with radiating fins. Cold water flows through these tubes, and the cooling fluid, such as air, flows over the surface of the fins on the tubes 15, whereby the heat is removed from the air and carried off by the water.

The arrangement of my invention shown in Figs. 3, 4 and 5 is applicable to very long machines. In these figures, the stationary member 2' is provided with ventilating spaces 4', 4² and 4³ arranged in groups. Chambers 16 are formed about the groups of ventilating spaces 4', chambers 17 are formed about the groups of ventilating spaces 4² and a chamber 18 about the group of ventilating spaces 4³. The chambers 16, 17 and 18 are formed by web members 7' and casing member 6'. The chambers 16 and 18 communicate with a chamber 5' formed between casing member 12 and casing member 6'. Chambers 17 are closed to chamber 5' by the casing member 6'. Mounted in chambers 16 and 18 are surface coolers 10'. The entrance for the air to these coolers is from the chamber 5' and the discharge is to the chambers 16 and 18 and adjacent the outer periphery of the ventilating spaces 4' and 4³. These surface coolers 10' are shown as standing vertically in the casing or frame of the stationary member 2'.

Mounted on each end of the rotatable member and preferably on the retaining rings 14' are fans 8' which have their intakes adjacent and communicating with the air gap and are so arranged as to draw cooling fluid, such as air, out of the air gap between the stationary and rotatable members into the chambers 16 and 18 through the surface coolers into the ventilating spaces 4' and 4³, whence it flows into the air gap, as will be more fully described hereinafter.

Each of the fans 8' has its outlet communicating with the adjacent chamber 5' through a discharge ring or diffusing chamber 9'. These diffusing chambers 9' are formed by end shields 19' and 20'. These diffusing chambers communicate with chamber 5' and have sloping walls so that the cross sectional area of each one, where it communicates with the chamber 5', is greater than the end adjacent the fans. With this constrution, the velocity head of the air entering the chamber 9' is gradually converted into a static pressure.

The chambers 17 are connected to other chambers 21 formed at the ends of the stationary member by the end shields, 19', by means of ducts 22 passing through the chambers 16. The chambers 21 are in direct communication with the inlets of the fans 9'.

The core of the rotatable member is shown as provided with longitudinal ventilating passages 23 and radial ventilating passages 24. Cooling fluid is supplied to these ventilating passages from the chambers 16 by means of ducts 25 formed between another end shield 26 and the end shield 20'.

Circulation of cooling fluid through the machine of these figures is indicated by arrows. When the rotatable member 1 revolves, air is discharged by the fans 8' into the diffusing chambers 9' whence it enters chamber 5', thence flows through the surface coolers 10', the chambers 16 and 18, thence through the groups of adjacent radial ventilating spaces 4' located at the ends of the stationary member and the group of radial ventilating spaces 4³ at the middle of the stationary member into the air gap. A portion of the air entering the air gap is drawn by the fans out of said air gap at the ends of the rotatable member and returned to the diffusing chambers 9'. Part of the air entering the air gap from the ventilating spaces 4' flows toward the center of the machine. The air entering the air gap from the ventilating spaces 4³ flows toward the ends of the machine uniting with that flowing toward it from the ventilating ducts 4' and all of this air flows outwardly through the ventilating spaces 4² into chambers 17 through the ducts 22 into chambers 21, over the end portions 3' of the stator winding outside the core to the inlet of the fans 8'. Part of the air in chambers 16 also flows through the ducts 25 through the longitudinal ventilating passages 23 in the rotatable member, out through the radial passages 24 and uniting with the air in the air gap.

In order that the air delivered to the air gap may divide and one portion flow toward the intake of the fan and the other portion flow toward the ventilating spaces 4², I prefer to make the number of ventilating spaces 4' greater than the number of ventilating spaces 4², whereby sufficient static pressure will be established in the air gap toward the intake of the fan to divert and force a sufficient quantity of air through the ventilating spaces 4². If desired, this static pressure may be obtained by mechanical restrictions in the air gap near the ends of the rotatable member and toward the intake of the fan.

It will be noted that the machines in all the figures of the drawing are completely enclosed, and that all the cooling fluid delivered to the air gap is returned to the intake of the fans.

By constructing the ventilating system so that the air is discharged by the fan into a diffusing chamber, the velocity pressure head is converted into a static pressure head. This static pressure is then used for forcing the air through the machine. In ventilating systems, for dynamo electric machines, as heretofore employed, most of this velocity head was lost in causing useless eddies, so that about half the total available energy for forcing the air through the machine was lost. It will therefore be seen that my ventilating system is very much more efficient than those heretofore used.

A fan operating to move a cooling fluid such as air has inherently certain losses, which are converted into heat and transmitted to the cooling fluid. In accordance with my system, this heat is removed by the coolers before the air passes into the machine. This is desirable since air of, say from five to seven degrees, lower temperature is delivered to the parts of the machine to be cooled, than would be the case if the air were blown directly into the machine.

My ventilating system requires no more space than systems heretofore used. In fact, the amount of space can be decreased. This is accomplished by placing the coolers as shown in the chambers adjacent the periphery of the stationary member instead of in a chamber below or at one side of the machine as heretofore. Furthermore, by placing the fans upon the retaining rings for the end windings of the rotatable member, the length of the machine may be decreased by an amount substantially equal to the width of the fans. Where a fan is employed on each end of the rotatable member, this saving in length is substantial. Furthermore, the width of axial type fans is considerably less than that of radial type fans. My ventilating system permits the use of axial type fans, whereas heretofore, it was necessary to use the radial type of fan.

My arrangement has a further advantage from the standpoint of the critical speed of the shaft. The critical speed of a rotatable member of a certain diameter is dependent upon its length. On the other hand, the diameter of a rotatable member is limited, because centrifugal force tends to unduly stress the material out of which the rotatable member is made. If, therefore, the rotatable member of a machine, designed to run at a definite speed and with radial fans mounted on the shaft as heretofore, is made of as large a diameter as possible and its shaft as long as possible from the standpoint of critical speed, it would not be possible to increase the size of the machine. However, by placing the fans on the retaining rings as herein pointed out, the rotatable member could be lengthened to an amount substantially equal to the width of the two radial fans as used heretofore. This would be appreciable.

When my invention is applied to turbo-alternators, the arrangement of Figs. 1 and 2 would be used in such machines of a capacity up to say 15,000 k. w. and the arrangement of Figs. 3 to 5 would be used in such machines of a capacity above say 40,000 k. w. For capacities between 15,000 and 40,000 k. w., an arrangement similar to Figs. 3 and 4 would be used, except that the middle chamber and the middle coolers would be omitted. I then would have end chambers formed about the outer periphery of the ventilating spaces located at the end of the stationary member, and a chamber intermediate the end chambers formed about the ventilating spaces located at the middle of the stationary member. The cooling fluid would flow downwardly from the end chambers through the end ventilating spaces and upwardly through the middle ventilating spaces into the intermediate chamber. The circulation otherwise would be like that in Figs. 3 to 5.

I desire it to be understood that my invention is not limited to the particular arrangements shown and described, and I aim in the appended claims to cover all modifications which do not depart from the spirit and scope of my invention.

What I claim as new and desire to secure by Letters Patent of the United States is:

1. In a dynamo electric machine, a rotatable member, a stationary member surrounding said rotatable member and having radial ventilating spaces, means forming a chamber about the outer periphery of said ventilating spaces, said ventilating spaces communicating with said chamber and the air gap between said rotatable and stationary members, and a fan on said rotatable member, the inlet of said fan communicating with said air gap and the outlet of said fan communicating with said chamber, said fan forcing cooling fluid into said chamber, through said radial ventilating spaces, into said air gap and out of said air gap at the end of said rotatable member.

2. In a dynamo electric machine, a rotatable member, a stationary member surrounding said rotatable member and having radial ventilating spaces, and a fan on said rotatable member, the inlet of said fan communicating with the air gap between said rotatable and stationary members, said fan drawing cooling fluid through said radial ventilating spaces, into said air gap and out of said air gap at the end of said rotatable member.

3. In a dynamo electric machine, a rotatable member, a stationary member surrounding said rotatable member and having radial ventilating spaces, means forming a chamber about the outer periphery of said ventilating spaces, said ventilating spaces communicating with said chamber and the air gap between said rotatable and stationary members, a fan on said rotatable member, the inlet of said fan communicating with said air gap and the outlet of said fan communicating with said chamber, said fan forcing cooling fluid into said chamber, through said radial ventilating spaces, into said air gap and out of said air gap at the end of said rotatable member, and means in said chamber for cooling said cooling fluid, said cooling means being located adjacent the outer periphery of said ventilating spaces.

4. In a dynamo electric machine, a rotatable member, a stationary member surrounding said rotatable member and having radial ventilating spaces, a fan mounted on said rotatable member, a discharge ring adjacent said fan and having an increasing cross section, and means forming a chamber about the outer periphery of said ventilating spaces located at the end of said stationary member, said discharge ring communicating with said chamber, said ventilating spaces located at the end of said stationary member communicating with said chamber and the air gap between said rotatable and stationary members, the inlet of said fan communicating with said air gap and the outlet of said fan communicating with said discharge ring, said fan forcing cooling fluid into said discharge ring, then into said chamber, through said ventilating spaces, and then into said air gap.

5. In a dynamo electric machine, a rotatable member, a stationary member surrounding said rotatable member and having radial ventilating spaces, a fan mounted on said rotatable member, a discharge ring adjacent said fan and having an increasing cross section, means forming a chamber about the outer periphery of said ventilating spaces located at the end of said stationary member, said discharge ring communicating with said chamber, said ventilating spaces located at the end of said stationary member communicating with their corresponding chamber and the air gap between said stationary and rotatable members, the inlet of said fan communicating with said air gap and the outlet of said fan communicating with said discharge ring, and a cooler in said chamber, said fan forcing cooling fluid into said discharge ring, then into said chamber and through said cooler, through said ventilating spaces and then into said air gap.

6. In a dynamo electric machine, a rotatable member, a fan mounted on each end of said rotatable member, a stationary member surrounding said rotatable member and having radial ventilating spaces, means forming a chamber about the outer periphery of a group of adjacent ventilating spaces located at a distance from said fans, said group of ventilating spaces located at a distance from said fans communicating with said chamber and the air gap between the rotatable and stationary members, and each of the inlets of said fans communicating with said chamber and said air gap, said fans drawing cooling fluid through said ventilating spaces communicating with said chamber, then into said chamber and through said fans, and means forming an end chamber about the outer periphery of said ventilating spaces located at each end of the stationary member, said ventilating spaces located at each end of the stationary member communicating with their corresponding end chamber and said air gap, and the outlet of each of said fans communicating with the adjacent end chamber, each of said fans forcing cooling fluid into the adjacent end chamber through said radial ventilating spaces communicating with said end chamber, then into said air gap and out of said air gap at the ends of said rotatable member.

7. In a dynamo electric machine, a rotatable member, a fan mounted on each end of said rotatable member, a discharge ring adjacent each of said fans, each discharge ring having an increasing cross section, a stationary member surrounding said rotatable member and having radial ventilating spaces, means forming a chamber about the outer periphery of a group of adjacent ventilating spaces located at a distance from said fans, said ventilating spaces located at a distance from said fans communicating with said chamber and the air gap between said rotatable and stationary members, the inlets of said fans communicating with said chamber and said air gap, said fans drawing cooling fluid through said ventilating spaces communicating with said chamber, then into said chamber and through said fans, and means forming an end chamber about the outer periphery of said ventilating spaces located at each end of the stationary member, each of said end chambers communicating with the adjacent discharge ring and the ventilating spaces about which it is formed, the outlet of each of said fans communicating with the adjacent discharge ring, each of said fans forcing cooling fluid into the adjacent discharge ring, then into the adjacent end chamber, through said radial ventilating spaces communicating with said end chamber, then into said air gap and out of said air gap at the ends of said rotatable member.

8. In a dynamo electric machine, a rotatable member, a fan mounted on each end of said rotatable member, a stationary member surrounding said rotatable member and having radial ventilating spaces, means forming a chamber about the outer periphery of a group of adjacent ventilating spaces located at a distance from said fans, means forming a duct from said chamber to the inlet of one of said fans, said ventilating spaces located at a distance from said fans communicating with said chamber and the air gap between said rotatable and stationary members, the inlets of said fans communicating with said duct and said air gap, said fans drawing cooling fluid through said ventilating spaces communicating with said chamber, into said chamber and through said fans, means forming an end chamber about the outer periphery of said ventilating spaces located at each end of the stationary member, and a discharge ring adjacent each fan, each of said discharge rings having an increasing cross section, each of said end chambers communicating with the adjacent discharge ring and the ventilating spaces about which it is formed, the outlet of each of said fans communicating with the adjacent discharge ring, each of said fans forcing cooling fluid into the adjacent discharge ring, then into the adjacent end chamber, through said radial ventilating spaces communicating with said end chamber, then into said air gap and out of said air gap at the ends of said rotatable member.

9. In a dynamo electric machine, a rotatable member, a fan mounted on each end of said rotatable member, a stationary member surrounding said rotatable member and having radial ventilating spaces, said stationary member having a winding provided with end turns, means forming a chamber about the outer periphery of a group of adjacent ventilating spaces located at a distance from said fans, means forming a duct from said chamber to the inlet of one of said fans, said ventilating spaces located at a distance from said fans communicating with said chamber and the air gap between said rotatable and stationary members, the inlets of said fans communicating with said duct and said air gap, said fans drawing cooling fluid through said ventilating spaces communicating with said chamber, into said chamber, over said end turns of said stationary winding, and through said fans, means forming an end chamber about the outer periphery of said ventilating spaces located at each end of the stationary member, a discharge ring adjacent each fan, each of said discharge rings having an increasing cross section, each of said end chambers communicating with the adjacent discharge ring and the ventilating spaces about which it is formed, the outlet of each of said fans communicating with the adjacent discharge ring, each of said fans forcing cooling fluid into the adjacent discharge ring, then into the adjacent end chamber, through said radial ventilating spaces communicating with said end chamber, then into said air gap and out of said air gap at the ends of said rotatable member.

10. In a dynamo electric machine, a rotatable member, a fan mounted on each end of said rotatable member, a stationary member surrounding said rotatable member and having radial ventilating spaces, means forming a chamber about the outer periphery of a group of adjacent ventilating spaces located at a distance from said fans, said ventilating spaces located at a distance from said fans communicating with said chamber and the air gap between said rotatable and stationary members, the inlets of said fans communicating with said chamber and said air gap, said fans drawing cooling fluid through said ventilating spaces communicating with said chamber, then into said chamber and through said fans, means forming an end chamber about the outer periphery of said ventilating spaces located at each end of the stationary member, each of said end chambers communicating with the adjacent discharge ring and the ventilating spaces about which it is formed, the outlet of each of said fans communicating with the adjacent discharge ring, and a cooler in each of said end chambers, each of said fans forcing cooling fluid into the adjacent end chamber and through said cooler, through said radial ventilating spaces communicating with said end chamber, then into said air gap and out of said air gap at the ends of said rotatable member.

11. In a dynamo electric machine, a rotatable member, a fan mounted on each end of said rotatable member, a stationary member surrounding said rotatable member and having radial ventilating spaces, means forming a chamber about the outer periphery of a group of adjacent ventilating spaces located at a distance from said fans, means forming a duct from said chamber to the inlet of one of said fans, said ventilating spaces located at a distance from said fans communicating with said chamber and the air gap between said rotatable and stationary members, the inlets of said fans communicating with said duct and said air gap, said fans drawing cooling fluid through said ventilating spaces communicating with said chamber, then into said chamber and through said fans, means forming an end chamber about the outer periphery of said ventilating spaces located at each end of the stationary member, a discharging ring adjacent each of said fans, each of said discharge rings having increasing cross sections, each of said end chambers communicating with the adjacent discharge ring and the ventilating spaces about which it is formed, the outlet of each of said fans communicating with the adjacent discharge ring, and a cooler in each of said end chambers, each of said fans forcing cooling fluid into the adjacent discharge ring, into the adjacent end chamber and through said cooler, through said radial ventilating spaces communicating with said end chamber, then into said air gap, and out of said air gap at the ends of said rotatable member.

12. In a dynamo electric machine, a rotatable member having ventilating passages therein, a fan mounted on each end of said rotatable member, a stationary member surrounding said rotatable member and having radial ventilating spaces, means forming a chamber about the outer periphery of a group of adjacent ventilating spaces located at a distance from said fans, said ventilating spaces located at a distance from said fans communicating with said chamber and the air gap beween said rotatable and stationary members, the inlets of said fans communicating with said chamber and said air gap, said fans drawing cooling fluid through said ventilating spaces communicating with said chamber, then into said chamber and through said fans, means forming an end chamber about the outer periphery of said ventilating spaces located at each end of the stationary member, said ventilating spaces located at each end of the stationary member communicating with their corresponding end chamber, the outlet of each of said fans communicating with the adjacent end chamber, each of said fans forcing cooling fluid into the adjacent end chamber, through said radial ventilating spaces communicating with said end chamber, into said air gap and out of said air gap at the ends of said rotatable member, and means forming a duct from each of said end chambers to said ventilating passages in said rotatable member whereby cooling fluid is delivered to said last mentioned ventilating passages.

13. In a dynamo electric machine, a rotatable member having ventilating passages therein, a fan mounted on each end of said rotatable member, a stationary member surrounding said rotatable member and having radial ventilating spaces, means forming a chamber about the outer periphery of a group of adjacent ventilating spaces located at a distance from said fans, means forming a duct from said chamber to the inlet of one of said fans, said ventilating spaces located at a distance from said fans communicating with said chamber and the air gap between said rotatable and stationary members, the inlets of said fans communicating with said duct and said air gap, said fans drawing cooling fluid through said ventilating spaces communicating with said chamber, then into said chamber and through said fans, means forming an end chamber about the outer periphery of said ventilating spaces located at each end of the stationary member, a discharge ring adjacent each of said fans, each of said discharge rings having an increasing cross section, each of said end chambers communicating with the adjacent discharge ring and the ventilating spaces about which it is formed, the outlet of each of said fans communicating with the adjacent discharge ring, each of said fans forcing cooling fluid into the adjacent end chamber, through said radial ventilating spaces communicating with said end chamber, then into said air gap and out of said air gap at the ends of said rotatable member, and means forming a duct from each of said end chambers to said ventilating passages in said rotatable member whereby cooling fluid is delivered to said last mentioned ventilating passages.

14. In a dynamo electric machine, a rotatable member having ventilating passages therein, a fan mounted on each end of said rotatable member, a stationary member surrounding said rotatable member and having radial ventilating spaces, means forming a chamber about the outer periphery of a group of adjacent ventilating spaces located at a distance from said fans, said ventilating spaces located at a distance from said fans communicating with said chamber and the air gap between said rotatable and stationary members, the inlets of said fans communicating with said chamber and said air gap, said fans drawing cooling fluid through said ventilating spaces communicating with said chamber, into said chamber and through said fans, means forming an end chamber about the outer periphery of said ventilating spaces located at each end of the stationary member, a cooler in said last mentioned chamber, said ventilating spaces located at each end of the stationary member communicating with their corresponding end chamber, the outlet of each of said fans communicating with the adjacent end chamber, each of said fans forcing cooling fluid into the adjacent end chamber and through said cooler, through said radial ventilating spaces communicating with said end chamber, into said air gap and out of said air gap at the ends of said rotatable member, and means forming a duct from each of said end chambers to said ventilating passages in said rotatable member whereby cooling fluid is delivered to said last mentioned ventilating passages.

15. In a dynamo electric machine, a rotatable member having ventilating passages therein, a fan mounted on each end of said rotatable member, a stationary member surrounding said rotatable member and having radial ventilating spaces, means forming a chamber about the outer periphery of a group of adjacent ventilating spaces located at a distance from said fans, means forming a duct from said chamber to the inlet of one of said fans, said ventilating spaces located at a distance from said fans communicating with said chamber and the air gap between said rotatable and stationry members, the inlets of said fans communicating with said duct and said air gap, said fans drawing cooling fluid through said ventilating spaces communicating with said chamber, into said chamber and through said fans, means forming an end chamber about the outer periphery of said ventilating spaces located at each end of the stationary member, a cooler in said last mentioned chamber, a discharge ring adjacent each of said fans, each of said discharge rings having an increasing cross section, each of said end chambers communicating with the adjacent discharge ring and the ventilating spaces about which it is formed, the outlet of each of said fans communicating with the adjacent discharge ring, each of said fans forcing cooling fluid through said cooler, then into said end chamber through said radial ventilating spaces communicating with said end chamber, into said air gap and out of said air gap at the ends of said rotatable member, and means forming a duct from each of said end chambers to said ventilating passages in said rotatable member whereby cooling fluid is delivered to said last mentioned ventilating passages.

16. In a dynamo electric machine, a rotatable member, a fan mounted on each end of said rotatable member, a stationary member surrounding said rotatable member and having radial ventilating spaces, means forming a central chamber about the outer periphery of a group of centrally located ventilating spaces, end chambers about the outer periphery of said ventilating spaces located at the ends of said stationary member and intermediate chambers about the outer periphery of other groups of ventilating spaces, said intermediate chambers being intermediate and closed off from the central and end chambers, said ventilating spaces communicating with the air gap between said rotatable and stationary members and said chambers adjacent thereto, the intake of said fans communicating with said air gap and said intermediate chambers, and the outlet of said fans communicating with said end chambers and said central chamber, said fans forcing cooling fluid into said end chambers and said central chamber, through said radial ventilating spaces communicating with said chambers, then into said air gap, some of the cooling fluid entering said air gap from said end chambers being drawn out of said air gap at the ends of said rotatable member, the balance of the cooling fluid entering the air gap from said end chambers and the cooling fluid entering the air gap from said central chamber flowing through said intermediate ventilating spaces into said intermediate chambers.

17. In a dynamo electric machine, a rotatable member, a fan mounted on each end of said rotatable member, a stationary member surrounding said rotatable member and having radial ventilating spaces, said stationary member having a winding provided with end turns, means forming a central chamber about the outer periphery of a group of centrally located ventilating spaces, end chambers about the outer periphery of said ventilating spaces located at the ends of said stationary member and intermediate chambers about the outer periphery of other groups of ventilating spaces, said intermediate chambers being intermediate and closed off from the central and end chambers, said ventilating spaces communicating with the air gap between said rotatable and stationary members and said chambers adjacent thereto, the intake of said fans communicating with said air gap and said intermediate chambers, and the outlet of said fans communicating with said end chambers and said central chamber, said fans forcing cooling fluid into said end chambers and said central chamber, through said radial ventilating spaces communicating with said chambers, then into said air gap, some of the cooling fluid entering said air gap from said end chambers being drawn out of said air gap at the ends of said rotatable member, the balance of the cooling fluid entering the air gap from said chambers and the cooling fluid entering the air gap from said central chamber flowing through said intermediate ventilating spaces into said intermediate chambers, then over said end turns of said stationary winding and then to the intake of said fans.

18. In a dynamo electric machine, a rotatable member, a fan mounted on each end of said rotatable member, a stationary member surrounding said rotatable member and having radial ventilating spaces, means forming a central chamber about the outer periphery of a group of centrally located ventilating spaces, end chambers about the outer periphery of said ventilating spaces located at the ends of said stationary member and intermediate chambers about the outer periphery of other groups of ventilating spaces, said intermediate chambers being intermediate and closed off from the central and end chambers, discharge rings adjacent said fans, each of said discharge rings having an increasing cross section, said ventilating spaces communicating with the air gap between said rotatable and stationary members and said chambers adjacent thereto, the intake of said fans communicating with said air gap and said intermediate chambers, and the outlet of said fans communicating with said end chambers and said central chamber through said discharge rings, said fans forcing cooling fluid into said discharge rings, then into said end chambers and said central chamber, through said radial ventilating spaces communicating with said chambers, then into said air gap, some of the cooling fluid entering said air gap from said end chambers being drawn out of said air gap at the ends of said rotatable member, the balance of the cooling fluid entering the air gap from said end chambers and the cooling fluid entering the air gap from said central chamber flowing through said intermediate ventilating spaces into said intermediate chambers.

19. In a dynamo electric machine, a rotatable member, a fan mounted on each end of said rotatable member, a stationary member surrounding said rotatable member and having radial ventilating spaces, said stationary member having a winding provided with end turns, means forming a central chamber about the outer periphery of a group of centrally located ventilating spaces, end chambers about the outer periphery of said ventilating spaces located at the ends of said stationary member and intermediate chambers about the outer periphery of other groups of ventilating spaces, said intermediate chambers being intermediate and closed off from the central and end chambers, means forming ducts from said intermediate chambers, discharge rings adjacent said fans, each of said discharge rings having an increasing cross section, said ventilating spaces communicating with the air gap between said rotatable and stationary members and said chambers adjacent thereto, the intake of said fans communicating with said air gap and said ducts from said intermediate chambers, and the outlet of said fans communicating with said end chambers and said central chamber through said discharge rings, said fans forcing cooling fluid into said discharge rings, then into said end chambers and said central chamber, through said radial ventilating spaces communicating with said chambers, then into said air gap, some of the cooling fluid entering said air gap from said end chambers being drawn out of said air gap at the ends of said rotatable member, the balance of the cooling fluid entering the air gap from said end chambers and the cooling fluid entering the air gap from said central chamber flowing through said intermediate ventilating spaces into said intermediate chambers, then through said ducts, over said end turns of said stationary winding and then to the intake of said fans.

20. In a dynamo electric machine, a rotatable member, a fan mounted on each end of said rotatable member, a stationary member surrounding said rotatable member and having radial ventilating spaces, said stationary member having a winding provided with end turns, means forming a central chamber about the outer periphery of a group of centrally located ventilating spaces, end chambers about the outer periphery of said ventilating spaces located at the ends of said stationary member and intermediate chambers about the outer periphery of other groups of ventilating spaces, said intermediate chambers being intermediate and closed off from the central and end chambers, means forming ducts from said intermediate chambers, discharge rings adjacent said fans, each of said discharge rings having an increasing cross section, said ventilating spaces communicating with the air gap between said rotatable and stationary members and said chambers adjacent thereto, the intake of said fans communicating with said air gap and said ducts from said intermediate chambers, and the outlet of said fans communicating with said end chambers and said central chamber through said discharge rings, and coolers, said fans forcing cooling fluid into said discharge rings, through said coolers, then into said end chambers and said central chamber, through said radial ventilating spaces communicating with said chambers, then into said air gap, some of the cooling fluid entering said air gap from said end chambers being drawn out of said air gap at the ends of said rotatable member, the balance of the cooling fluid entering the air gap from said end chambers and the cooling fluid entering the air gap from said central chamber flowing through said intermediate ventilating spaces into said intermediate chambers, then through said ducts, over said end turns of said stationary winding and then to the intake of said fans.

21. In a dynamo electric machine, a rotatable member, a stationary member surrounding said rotatable member and having radial ventilating spaces, means for completely enclosing said stationary and rotatable members, and a fan on said rotatable member having its intake adjacent the air gap between the rotatable and stationary members, said fan drawing cooling fluid from said radial ventilating spaces into said air gap and out of said air gap at the end of said rotatable member, all of said cooling fluid delivered to said air gap being returned to the intake of said fan.

In witness whereof, I have hereunto set my hand this 20th day of April, 1925.

EDWARD H. FREIBURGHOUSE.